(12) United States Patent
Shimada et al.

(10) Patent No.: US 8,551,627 B2
(45) Date of Patent: Oct. 8, 2013

(54) MAGNETIC DISK AND METHOD OF MANUFACTURING THE SAME

(75) Inventors: Akira Shimada, Tokyo (JP); Ito Nakamura, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 499 days.

(21) Appl. No.: 12/666,552

(22) PCT Filed: Sep. 24, 2008

(86) PCT No.: PCT/JP2008/067185
§ 371 (c)(1), (2), (4) Date: Oct. 1, 2010

(87) PCT Pub. No.: WO2009/041432
PCT Pub. Date: Apr. 2, 2009

(65) Prior Publication Data
US 2011/0014498 A1    Jan. 20, 2011

(30) Foreign Application Priority Data
Sep. 28, 2007  (JP) .................................. 2007-256863

(51) Int. Cl.
*G11B 5/66* (2006.01)
(52) U.S. Cl.
USPC .......................... 428/835.4; 360/135; 427/131
(58) Field of Classification Search
USPC .................................. 428/833.5, 833.6, 834.5
See application file for complete search history.

(56) References Cited

U.S. PATENT DOCUMENTS 6,706,363 B2 *  3/2004  Honda et al. ............... 428/835.4
6,805,891 B2 * 10/2004  Vijayen et al. ................ 428/835

FOREIGN PATENT DOCUMENTS

JP      2003-196819 A    7/2003
JP      2004-127493 A    4/2004

OTHER PUBLICATIONS

English machine translation of JP 2004-127493, Japan, Apr. 2004.*
Written Opinion for Singapore Patent Application No. 200908588-7 dated Apr. 27, 2011, 5 pages.
Examination Report for Singapore Patent Application No. 200908588-7 dated Jan. 3, 2012, 6 pages.

* cited by examiner

*Primary Examiner* — Holly Rickman

(57) ABSTRACT

This invention provides a magnetic disk which can satisfactorily suppress the elution of internal components from an end face of a magnetic disk, and corrosion damage. The magnetic disk comprises a disk substrate, and a thin film including a magnetic layer, a carbon-based protective layer, and a lubricating layer provided in that order on the disk substrate. The main surface and the end face of the magnetic disk are covered with the carbonaceous protective layer. The carbon-based protective layer contains nitrogen at a part adjacent to the lubricating layer. The content of nitrogen atoms relative to the content of carbon atoms in the protective layer formed on the end face is equal to or more than the content of nitrogen atoms relative to the content of carbon atoms in the protective layer formed on the main surface.

17 Claims, 1 Drawing Sheet

MAGNETIC DISK AND METHOD OF MANUFACTURING THE SAME

TECHNICAL FIELD

This invention relates to a magnetic disk adapted to be mounted in a magnetic disk apparatus for recording information, such as a hard disk drive (HDD), and a method of manufacturing the same.

BACKGROUND ART

Conventionally, magnetic disk apparatuses have employed the CSS (Contact Start and Stop) system in which a magnetic head is held in contact with a contact-sliding inner region surface on a magnetic disk while the apparatus is stopped, then at the time of start-up, the magnetic head is slightly flown up while sliding in contact with the inner region surface and then recording/reproduction is started on a recording/reproducing region surface located outside the contact-sliding inner region surface. In this CSS system, it is necessary to provide the contact-sliding region on the magnetic disk apart from the recording/reproducing region.

Further, in the CSS system, in order to prevent contact adhesion between the magnetic disk and the magnetic head while being stopped, it is carried out to provide a concave-convex shape with a certain surface roughness, called texture, on the main surface of the magnetic disk. Further, in the CSS system, it is carried out that the surface of the magnetic disk is coated with a protective layer in order to protect the magnetic disk from contact sliding of the magnetic head, and so on.

On the other hand, in recent years, the LUL (Load Unload) system capable of an increase in recording capacity has started to be employed. In the LUL system, a magnetic head is retreated to an inclined platform called a ramp located outside a magnetic disk while being stopped, then at the time of start-up, the magnetic head is caused to slide from the ramp, after the magnetic disk starts to rotate, so as to fly over an LUL region on a surface of the magnetic disk to perform recording/reproduction and, therefore, the magnetic head does not make contact sliding on the magnetic disk.

In the LUL system, since it is not necessary to provide a contact-sliding region for the magnetic head on the surface of the magnetic disk as in the CSS system, there is an advantage in that a larger area of a recording/reproducing region can be ensured as compared with the CSS system and thus the recording capacity of the magnetic disk can be increased.

Further, in the LUL system, since the magnetic disk and the magnetic head are not brought into contact with each other, it is not necessary to provide texture as in the CSS system and thus the surface of the magnetic disk can be further smoothed. Consequently, there is also an advantage in that it is possible to reduce the flying height of the magnetic head (10 nm or less) as compared with the case of the CSS system and thus to increase the recording density of the magnetic disk.
Patent Document 1: JP-A-2004-127493

DISCLOSURE OF THE INVENTION

Problem to be Solved by the Invention

However, following the shift from the CSS system to the LUL system, the corrosion failure of a reproducing element portion of a magnetic head has occurred frequently. When the corrosion phenomenon of the head reproducing element portion occurs, the read error occurs frequently due to a reduction in output of reproduced signals and, depending on circumstances, reproduction may be totally disabled or a corroded portion may expand to cause damage to a magnetic disk while flying.

A recent magnetic head employs an NPAB slider (negative pressure slider) capable of easily controlling the flying height, but since a negative pressure is generated at a surface of the slider while flying, the magnetic head tends to gradually collect and concentrate, like a vacuum cleaner, very small quantities of organic and inorganic adhering substances and so on, which are present in a recording/reproducing region on a surface of a magnetic disk, onto the surface of the slider, thereby depositing them on the surface of the slider.

As a result of the study on a cause of the tendency that the corrosion failure is liable to occur in the case of the LUL system as compared with the CSS system, the present inventors have found out that, in the CSS system, the deposited substances transferred onto the magnetic head are cleaned off when the magnetic head makes contact sliding in a contact-sliding region on the surface of the magnetic disk, while, in the LUL system, since the magnetic head does not make contact sliding on the magnetic disk, this cleaning action is not obtained.

Then, as a result of further proceeding with the study, it has been considered that, in the LUL system, since the cleaning action is not obtained, the concentrated contaminants (contamination substances) transferred onto the magnetic head, particularly acid-based contaminants such as sulfide-based contaminants, chloride-based contaminants, or nitride-based contaminants, cause corrosion of the reproducing element portion. Particularly, a magnetoresistive effect reproducing element (MR, GMR, or TMR element or the like) capable of obtaining high output tends to be corroded.

As different from a conventionally used thin film head, a magnetoresistive effect head has a recording/reproduction separated structure in which a recording element and a reproducing element are separated from each other. In the case of the recording/reproduction separated structure, it is necessary to form a wide shield of Fe—Ni based permalloy or the like between both elements. It has been found that since this permalloy is an alloy liable to be corroded, it is necessary to strictly prevent the corrosion phenomenon in the case of the magnetoresistive effect head as different from the thin film head.

In order to suppress the occurrence of such a corrosion failure, the above-mentioned Patent Document 1 discloses a technique of setting the thickness of a protective layer on an end face of a magnetic disk to be greater than that of the protective layer on a main surface thereof.

In the meantime, in recent years, HDDs have been increased in capacity and reduced in weight and have often been used particularly for mobile applications. Conventionally, HDDs were used almost as storage devices of computers, but recently, have been mounted in mobile phones, car navigation systems, and the like so that the chance to be exposed to an environment of use much severer than conventional has been increasing. Therefore, magnetic disks mounted in the HDDs are required to be capable of normal writing and reading even under various environmental conditions. Accordingly, for magnetic disks, a reliability test is performed by leaving them under severe environmental conditions (high temperature and humidity), and so on.

According to the study of the present inventors, under high temperature and humidity conditions, components are eluted on a surface of a magnetic disk from a layer and a substrate forming the magnetic disk and then solidified so that corrosion occurs. If the corrosion occurs, there arises a problem that irregularities are formed on the surface to disable normal recording/reproduction as a magnetic disk. The mechanism of such elution of the internal components and corrosion is assumed such that since particularly an end face of a conventional magnetic disk is difficult to cover with a protective layer and a lubricating layer as compared with a main surface thereof, water penetrates into the magnetic disk through the end face in a high temperature and humidity environment and components of a magnetic layer, a substrate, and so on are dissolved in the water and then diffused on a surface of the magnetic disk.

As disclosed in the above-mentioned Patent Document 1, by setting the thickness of the protective layer on the end face of the magnetic disk to be greater than that of the protective layer on the main surface thereof, it is possible to suppress the elution of metal ions of the magnetic layer. However, the requirement for reliability under high temperature and humidity conditions tends to further increase in recent years and it has been found that, only with the technique disclosed in the above-mentioned Patent Document 1, it is not sufficient to prevent the elution of components and corrosion caused by water adhesion to an end face of a magnetic disk particularly under high temperature and humidity conditions.

Therefore, this invention has been made in view of the above-mentioned problems and has an object to provide a magnetic disk capable of sufficiently suppressing the elution of internal components from an end face of the magnetic disk and the occurrence of a corrosion failure, and a method of manufacturing such a magnetic disk.

Means for Solving the Problem

The present inventors have further looked into the above-mentioned mechanism of the occurrence of the corrosion phenomenon and paid attention to a protective layer and a lubricating layer of a magnetic disk, particularly to the protective layer and the lubricating layer on an end face of the disk and, as a result of an intensive study, have completed this invention.

Specifically, in order to solve the above-mentioned problems, this invention has the following structures.

(Structure 1)
A magnetic disk comprising a thin film comprising a magnetic layer, a carbon-based protective layer, and a lubricating layer formed in this order over a disk substrate, wherein a main surface and an end face of the magnetic disk are covered with the carbon-based protective layer, the carbon-based protective layer contains nitrogen at a part adjacent to the lubricating layer, and the content of nitrogen atoms relative to the content of carbon atoms in the protective layer formed on the end face is equal to or more than the content of nitrogen atoms relative to the content of carbon atoms in the protective layer formed on the main surface.

(Structure 2)
A magnetic disk according to Structure 1, wherein the content of nitrogen atoms relative to the content of carbon atoms in the protective layer formed on the end face is 0.10 (atomic ratio) or more.

(Structure 3)
A magnetic disk according to Structure 1 or 2, wherein the protective layer on the end face of the magnetic disk has a coverage of 95% or more.

(Structure 4)
A magnetic disk according to any one of Structures 1 to 3, wherein the carbon-based protective layer is a protective layer formed by a plasma CVD method.

(Structure 5)
A magnetic disk according to any one of Structures 1 to 4, wherein the magnetic layer is a cobalt (Co) alloy based magnetic layer.

(Structure 6)
A method of manufacturing a magnetic disk, wherein forming a magnetic layer and a carbon-based protective layer in this order over a disk substrate to cover a main surface and an end face of the magnetic disk with the carbon-based protective layer, and then doping nitrogen into the carbon-based protective layer at a part adjacent to a lubricating layer so that the content of nitrogen atoms relative to carbon in the protective layer formed on the end face is equal to or more than the content of nitrogen atoms relative to the content of carbon atoms in the protective layer formed on the main surface.

Effect of the Invention

According to a magnetic disk of this invention, a carbon-based protective layer contains nitrogen at a part adjacent to a lubricating layer and the content of nitrogen atoms relative to the content of carbon atoms in the protective layer formed on an end face of the magnetic disk is equal to or more than the content of nitrogen atoms relative to the content of carbon atoms in the protective layer formed on a main surface of the magnetic disk. This makes it possible to sufficiently suppress the elution of internal components and the occurrence of corrosion caused by water adhesion to the end face of the magnetic disk particularly under high temperature and humidity conditions.

Further, according to a magnetic disk manufacturing method of this invention, it is possible to suitably manufacture a magnetic disk that exhibits the above-mentioned effect.

Figure 1:
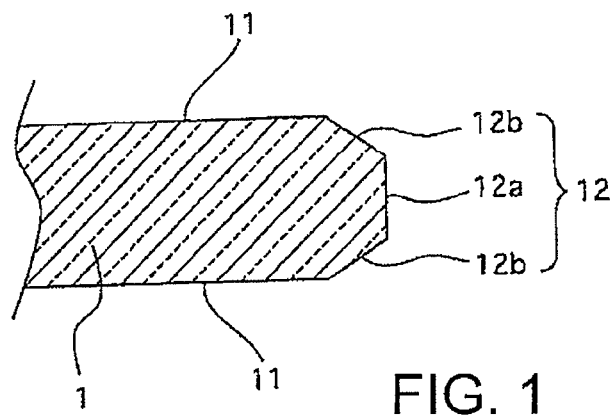
FIG. 1 is a side sectional view of a glass substrate.

DESCRIPTION OF SYMBOLS 1 glass substrate
10 magnetic disk
21 to 24 nitrogen plasma generating sources

BEST MODE FOR CARRYING OUT THE INVENTION

Hereinbelow, the best mode for carrying out this invention will be described in detail.

A magnetic disk of this invention has a magnetic layer, a carbon-based protective layer, and a lubricating layer formed in this order over a disk substrate. Herein, the protective layer and the lubricating layer are provided for protecting the magnetic layer from corrosion, abrasion, impact of a magnetic head, and so on. The magnetic disk of this invention is characterized in that a main surface and an end face of the magnetic disk are covered with the carbon-based protective layer, the carbon-based protective layer contains nitrogen at a part adjacent to the lubricating layer, and the content of nitrogen atoms relative to the content of carbon atoms in the protective layer formed on the end face is equal to or more than the content of nitrogen atoms relative to the content of carbon atoms in the protective layer formed on the main surface.

In a magnetic disk, a lubricant such as, for example, a perfluoropolyether-based lubricant with lubricating action and low surface energy is coated on a carbon-based protective layer to form a lubricating layer, wherein, in order to enhance adhesiveness to and coatability of the lubricant, it is preferable to contain nitrogen in the carbon-based protective layer, particularly at a part of the carbon-based protective layer that is adjacent to the lubricating layer. However, in a conventional magnetic disk, since the content of nitrogen atoms particularly at its end face is lower than that at its main surface, it is difficult to cover the end face with the lubricant. In this invention, by setting the content of nitrogen atoms relative to the content of carbon atoms in the protective layer formed on the end face of the magnetic disk to be equal to or more than the content of nitrogen atoms relative to the content of carbon atoms in the protective layer formed on the main surface of the magnetic disk, the lubricating layer can be formed by sufficiently adhering the lubricant also to the end face of the magnetic disk and, as a result, the surface energy of the end face of the magnetic disk decreases so that water adhesion can be suppressed. Therefore, it is possible to sufficiently suppress the elution of internal components and the occurrence of corrosion caused by water adhesion to the end face of the magnetic disk particularly under high temperature and humidity conditions.

In order to set the content of nitrogen atoms relative to the content of carbon atoms in the protective layer formed on the end face of the magnetic disk to be equal to or more than the content of nitrogen atoms relative to carbon in the protective layer formed on the main surface of the magnetic disk, the carbon-based protective layer is formed by, for example, a CVD (Chemical Vapor Deposition) method and then nitrogen is doped into a surface of the protective layer by introducing a nitrogen plasma into a chamber. In order to positively perform nitrogen doping particularly in an end face area of the magnetic disk, there is cited, for example, a method of, in the nitriding chamber, separately disposing nitrogen plasma generating sources directed towards the end face area of the magnetic disk so that a nitrogen plasma is directly irradiated to the end face area, or converting nitrogen into radicals and showering them to perform uniform nitrogen doping not only in a main surface area of the magnetic disk, but also in the end face area thereof.

In order to sufficiently obtain the effect by this invention, the content of nitrogen atoms relative to the content of carbon atoms in the protective layer formed on the end face of the magnetic disk is preferably 0.10 (atomic ratio) or more.

A glass substrate for a magnetic disk comprises two main surfaces and end faces each formed therebetween, wherein each end face comprises two chamfered faces continuous with the two main surfaces, respectively, and a side wall face formed between the chamfered faces. In a magnetic disk manufactured using such a glass substrate, the content of nitrogen atoms relative to carbon in a protective layer formed on each end face of the magnetic disk is such that the content of nitrogen atoms at each chamfered face and the content of nitrogen atoms at the side wall face are each equal to or more than that at the main surface.

It is considered that the elution amount of internal components from the inner peripheral side end face of the disk is smaller than the elution amount of internal components from the outer peripheral side end face. This is because the circumferential length of the inner peripheral side end face is smaller than the circumferential length of the outer peripheral side end face. Further, this is because it is considered that, in a normal magnetic disk apparatus, an inner peripheral side end face portion is in contact with a spindle hub and thus a portion exposed to a magnetic disk apparatus atmosphere is small. However, in terms of obtaining the effect of this invention more reliably, it is preferable that, also with respect to the inner peripheral side end face, the content of nitrogen atoms in the protective layer be set equal to or more than the content of nitrogen atoms in the protective layer formed on the main surface.

On the other hand, the thickness of the protective layer on the main surface is often properly set so as to realize a desired information recording density as a magnetic disk apparatus. For example, in order to realize the desired information recording density, a predetermined spacing (distance between a magnetic disk and a magnetic head during recording/reproduction) is set and, in order to realize this spacing, a predetermined thickness of the protective layer on the main surface is set. In this manner, the thickness of the protective layer on the main surface of the magnetic disk is determined. The thickness of the protective layer on the main surface of the disk is preferably set equal to or more than 30 Å ($30 \times 10^{-10}$ m) for suppressing the elution of internal components, but it is necessary to reduce the thickness of the protective layer as much as possible for suppressing the spacing following the increase in recording density of magnetic disks and, from that aspect, the upper limit is preferably set equal to or less than 60 Å ($60 \times 10^{-10}$ m).

In the magnetic disk of this invention, the protective layer on the end face of the disk preferably has a coverage of 95% or more. By increasing the degree of coverage of the end face portion with the protective layer, it is possible to sufficiently suppress, for example, the elution of metal ions from the end face.

In this invention, the protective layer is a carbon-based protective layer. Generally, the carbon-based protective layer has high film hardness and is excellent in abrasion resistance and sliding characteristics. Particularly, a carbon-based protective layer containing hydrogen forms a high-rigidity stable amorphous structure because H (hydrogen) fills dangling bonds of C (carbon) and therefore the protective film as a whole exhibits high abrasion resistance. Further, since this carbon-based protective layer containing hydrogen has an extremely dense structure, the function of preventing the elution of metal ions from the magnetic layer is high.

In this invention, the protective layer contains nitrogen at its surface portion in contact with the lubricating layer. Therefore, if a portion, in contact with the magnetic layer, of the protective layer is formed as a carbon-hydrogen based protective layer and a surface portion, in contact with the lubricating layer, of the protective layer is formed as a carbon-nitrogen based protective layer or a carbon-hydrogen-nitrogen based protective layer, it is preferable for this invention.

In this invention, the carbon-based protective layer is preferably a diamond-like carbon protective layer mainly composed of carbon. The carbon-hydrogen based protective layer and the carbon-nitrogen based protective layer are also preferably formed as diamond-like carbon protective layers mainly composed of carbon.

Such a carbon-based protective layer is formed by, for example, a sputtering method. Normally, in the sputtering method, when carbon atoms are sputtered onto a substrate (in a state where at least a magnetic layer is formed on a glass substrate), the carbon atoms are sputtered perpendicularly to the substrate with high linearity and, therefore, a protective layer is hardly formed on inner and outer peripheral end faces of the substrate. However, as a result of the study of the present inventors, it has been found that, by carrying out sputtering while applying a predetermined bias to a substrate during formation of a protective layer, the direction of sputtering carbon atoms is oriented toward end faces of the substrate in advance so that the protective layer is formed not only on a main surface of the substrate, but also on the end faces thereof. By this, the thicknesses of the protective layer at its portions on the main surface and the end faces of the disk can be adjusted to predetermined values, respectively.

The formation of the protective layer is not limited to the sputtering method described above, but can be carried out, for example, by a plasma CVD method while applying a bias.

In this invention, as a material of the magnetic layer, use can be made of a hexagonal-system CoPt-based ferromagnetic alloy with a large anisotropic magnetic field. As a method of forming the magnetic layer, use can be made of a method of forming the magnetic layer on the glass substrate by a sputtering method, for example, a DC magnetron sputtering method. By interposing an underlayer between the glass substrate and the magnetic layer, it is possible to control the orientation direction and size of magnetic grains in the magnetic layer. For example, using a cubic-system underlayer made of a Cr-based alloy or the like, it is possible to orient the easy magnetization direction of the magnetic layer along the plane of the magnetic disk. In this case, the magnetic disk of the in-plane magnetic recording type is manufactured. On the other hand, for example, using a hexagonal-system underlayer containing Ru and Ti, it is possible to orient the easy magnetization direction of the magnetic layer along the normal of the plane of the magnetic disk. In this case, the magnetic disk of the perpendicular magnetic recording type is manufactured. The underlayer can be formed by the sputtering method like the magnetic layer.

The magnetic disk of this invention comprises the lubricating layer on the carbon-based protective layer. A material of the lubricating layer is not particularly limited, but the material is preferably excellent in adhesion to the carbon-based protective layer (particularly the carbon-nitrogen based protective layer containing nitrogen) and may be a liquid or solid. Specifically, a PFPE (perfluoropolyether) compound is preferable as a lubricant forming the lubricating layer. As such a PFPE (perfluoropolyether) compound, alcohol-modified PFPE can be preferably used. The alcohol-modified PFPE has a chemical structure comprising hydroxyl groups (—OH) as terminal functional groups of the PFPE main chain.

A known method such as a dipping method, a spray method, or a spin coating method can be used for forming the lubricating layer. The thickness of the lubricating layer is not particularly limited in this invention, but is preferably set to normally about 5 to 20 Å (5 to 20×10-10 m). The thickness of the lubricating layer in the end face area of the magnetic disk is also preferably set to 5 to 20 Å (5 to 20×10-10 m).

In this invention, a glass substrate is preferably used as the substrate. The glass substrate has high smoothness and thus can satisfy the requirement for the reduction in flying height of magnetic heads following the increase in recording density. As a material of the glass substrate, there is cited, for example, a glass ceramic such as an aluminosilicate glass, soda-lime glass, soda aluminosilicate glass, aluminoborosilicate glass, borosilicate glass, quartz glass, chain silicate glass, or crystallized glass. The aluminosilicate glass is particularly preferable because it is excellent in impact resistance and vibration resistance.

Such an aluminosilicate glass can provide a compressive stress layer at surfaces of the glass substrate by chemical strengthening, is excellent in bending strength, rigidity, impact resistance, vibration resistance, and thermal resistance, is not subjected to precipitation of Na even in a high temperature environment, can maintain the flatness, and is also excellent in Knoop hardness.

The thickness of the glass substrate is preferably about 0.1 mm to 1.5 mm.

In this invention, the disk substrate preferably has mirror-polished main surfaces and the mirror surface quality of the main surface is preferably such that Rmax (Rz) is 6 nm or less and Ra is 0.6 nm or less.

The end faces are also preferably mirror-polished. As the mirror surface quality of the end face, it is preferably a mirror surface with a surface roughness of 1 μm or less in Rmax (Rz) and 0.1 μm or less in Ra. Rz and Ra are based on the Japanese Industrial Standard (JIS) B0601 and JIS B0601 is a translation standard of ISO (International Organization for Standardization).

Specifically, Rz is described in ISO 4287-1996 Section 4.1.3 and Ra is described in ISO 4287-1996 Section 4.2.1.

EXAMPLES

Hereinbelow, the embodiment of this invention will be described in further detail by citing Examples. This invention is not limited to the following Examples.

Example 1

In this Example, first, a disk-shaped glass substrate made of aluminosilicate glass and having a diameter of 66 mmφ and a thickness of 1.5 mm was obtained from a molten glass by direct pressing using upper, lower, and drum molds. Then, by applying thereto a rough lapping process (rough grinding process), a shaping process, a precision lapping process (precision grinding process), an end face mirror finishing process, a first polishing process, and a second polishing process in sequence and then applying chemical strengthening thereto, a glass substrate 1 for a magnetic disk was manufactured. This glass substrate was mirror-polished at its main surfaces and end faces.

As a result of performing a visual inspection and a precision inspection of the surfaces of the glass substrate having been subjected to the above-mentioned chemical strengthening and subsequent cleaning, no defect such as a projection due to adhering matter or a crack was discovered on the surfaces of the glass substrate. The surface roughness of the main surfaces of the glass substrate obtained through the above-mentioned processes was measured by an atomic force microscope (AFM) and, as a result, there was obtained the magnetic-disk glass substrate having the ultra-smooth surfaces with Rmax (Rz)=2.13 nm and Ra=0.20 nm. The glass substrate had an outer diameter of 65 mm, an inner diameter of 20 mm, and a thickness of 0.635 mm.

As shown in FIG. 1, the obtained glass substrate 1 comprises two main surfaces 11, 11 and an end face 12 formed therebetween, wherein the end face 12 comprises two chamfered faces 12b, 12b and a side wall face 12a formed therebetween. This end face is formed on each of the inner peripheral side and the outer peripheral side of the glass substrate 1 in the same manner. The surface roughness of the end faces was 0.8 μm in Rmax (Rz) and 0.07 μm in Ra and thus was greater as compared with the main surfaces.

Then, using a single-wafer sputtering apparatus, an adhesive layer, a soft magnetic layer, a first underlayer, a second underlayer, and a magnetic layer were formed in this order on the obtained magnetic-disk glass substrate 1. Then, a carbon-based protective layer was formed by the plasma CVD method and a lubricating layer was further formed thereon by the dipping method. This magnetic disk is a magnetic disk of the perpendicular magnetic recording type.

As the adhesive layer, a Ti-based alloy thin film was formed to a thickness of 100 Å ($100 \times 10^{-10}$ m).

As the soft magnetic layer, a Co-based alloy thin film was formed to a thickness of 600 Å ($600 \times 10^{-10}$ m).

As the first underlayer, a Pt-based alloy thin film was formed to a thickness of 70 Å ($70 \times 10^{-10}$ m). Further, as the second underlayer, a Ru-based alloy thin film was formed to a thickness of 400 Å ($400 \times 10^{-10}$ m).

The magnetic layer was made of a CoPtCr alloy and formed to a thickness of 200 Å ($200 \times 10^{-10}$ m).

The protective layer was a diamond-like carbon protective layer and was formed by the plasma CVD method. The formation of the protective layer was carried out while applying an 800 W high-frequency bias to the substrate so that the thickness of the protective layer became 50 Å ($50 \times 10^{-10}$ m) on the main surface.

Figure 3:
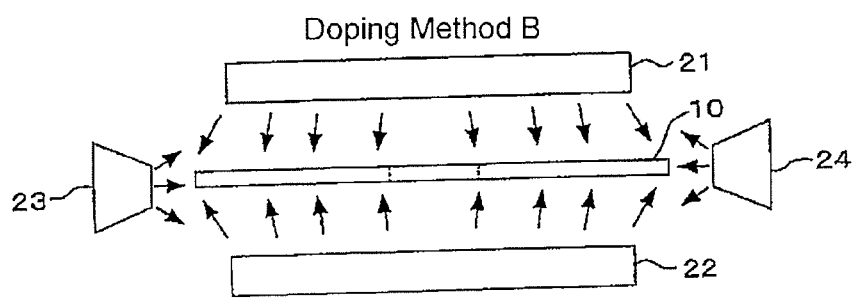
FIG. 3 is a schematic structural diagram showing a nitrogen doping method in an Example.

After the formation of the protective layer, nitrogen doping was carried out. As shown in FIG. 3 (doping method B), with respect to a magnetic disk 10 formed with the layers up to the protective layer, nitrogen plasma generating sources 21, 22 were disposed to face both upper and lower main surfaces of the magnetic disk and nitrogen plasma generating sources 23, 24 were disposed to face the end face thereof, thereby doping nitrogen into surfaces of the protective layer. The nitriding conditions in this event were such that the gas pressure was 2 Pa, the high-frequency power was 100 W, and the nitriding time was 1 second.

As a result of measuring the nitrogen doping amount in the protective layer by the X-ray photoelectron spectroscopy (XPS), the contents of nitrogen atoms relative to the contents of carbon atoms in the protective layer at its portions formed on the side wall face and the chamfered faces of the end face and the main surfaces were each 0.10 (atomic ratio).

Then, the lubricating layer was formed by the dipping method of immersing the magnetic disk in a perfluoropolyether liquid lubricant and then heated/burned at 110° C. for 60 minutes so that the thickness was 15 Å ($15 \times 10^{-10}$ m). As the perfluoropolyether (PFPE), use was made of alcohol-modified PFPE comprising hydroxyl groups (—OH) at both terminals of the PFPE main chain.

Figure 2:
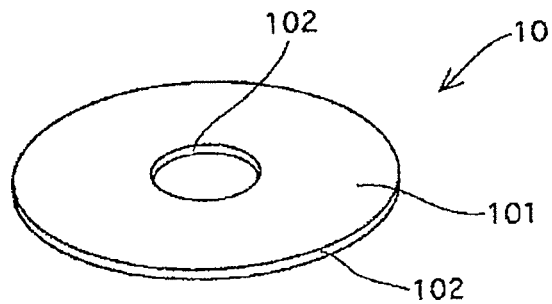
FIG. 2 is an overall perspective view of a magnetic disk.

As shown in FIG. 2, the obtained magnetic disk 10 comprises two main surfaces 101 and end faces 102 each formed therebetween.

With respect to the obtained magnetic disk, the outer peripheral end face thereof was evaluated. As a result, the magnetic layer, the protective layer, and the lubricating layer were formed over the entire region of the disk end face 102 comprising the side wall face 12a and the two chamfered faces 12b, 12b of the glass substrate 1. This also applied to the inner peripheral end face. Further, as a result of measurement by the X-ray photoelectron spectroscopy, the coverage of the protective layer over the outer peripheral end face was 98%.

Then, the following corrosion inspection was carried out for the obtained magnetic disk.

[Corrosion Inspection]

The obtained magnetic disk was left in a high temperature and humidity environment of 70° C. and 80% RH for 120 hours and then taken out. Then, it was inspected whether or not corrosion occurred on the surfaces of the magnetic disk, by a visual inspection under a high-intensity halogen lamp and an inspection using an optical microscope with 50 times magnification. As a result, no occurrence of corrosion was observed in the magnetic disk of this Example.

After the corrosion inspection described above, a durability-reliability evaluation was performed by the following LUL test.

[LUL Test]

The above-mentioned magnetic disk and a magnetic head comprising a giant magnetoresistive effect reproducing element (GMR element) were mounted in a magnetic recording apparatus. Then, with a flying height of 10 nm during flying of the magnetic head, load/unload operations of the head were repeated in a high temperature and humidity environment of 70° C. and 80% RH in the magnetic recording apparatus. As a result, the magnetic disk of this Example endured the load/unload operations of 800,000 times.

After the durability-reliability test described above, the magnetic disk and the magnetic head were taken out of the magnetic recording apparatus. Then, the surfaces of the magnetic disk and a slider portion, a GMR element portion, and a shield portion of the magnetic head were inspected by a visual inspection under a high-intensity halogen lamp and an inspection using an optical microscope with 50 times magnification. As a result, no occurrence of corrosion was observed in either of the magnetic disk and the magnetic head.

With respect to the magnetic disk of this Example, the contents of nitrogen atoms and the contents of carbon atoms in the protective layer at its portions on the end face and the main surface and the results of the corrosion inspection and the LUL test are collectively shown in later-described Table 1.

N/C in Table 1 represents the content of nitrogen atoms relative to the content of carbon atoms (atomic ratio) in the protective layer, and the content of nitrogen atoms and the content of nitrogen atoms were measured by XPS.

Example 2

A magnetic disk of Example 2 was manufactured in the same manner as in Example 1 except that nitrogen was doped into a protective layer by the method shown in FIG. 3 under conditions of a gas pressure of 4 Pa, a high-frequency power of 100 W, and a nitriding time of 1 second. Then, the same tests as in Example 1 were carried out. These results are collectively shown in later-described Table 1.

Examples 3 and 4

Magnetic disks of Examples 3 and 4 were manufactured in the same manner as in Example 1 except that nitrogen was doped into a protective layer by a radical nitriding method (doping method C) under conditions of a gas pressure of 2 Pa and a nitriding time of 1 second in Example 3 and under conditions of a gas pressure of 3 Pa and a nitriding time of 1 second in Example 4. Then, the same tests as in Example 1 were carried out. These results are collectively shown in later-described Table 1.

Comparative Example 1

A magnetic disk was manufactured in the same manner as in Example 1 except that nitrogen doping was not carried out after forming a protective layer. Then, the same tests as in Example 1 were carried out. These results are collectively shown in later-described Table 1.

Comparative Example 2

Figure 4:
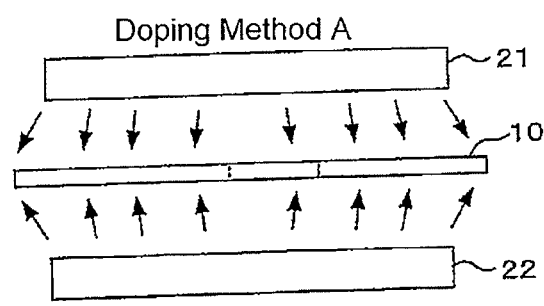
FIG. 4 is a schematic structural diagram showing a nitrogen doping method (conventional method) in a Comparative Example.

A magnetic disk was manufactured in the same manner as in Example 1 except that, as shown in FIG. 4 (doping method A), nitrogen was doped into a protective layer by disposing nitrogen plasma generating sources 21, 22 on both upper and lower main surface sides of a magnetic disk 10 (conventional method). Then, the same tests as in Example 1 were carried out. These results are collectively shown in later-described Table 1.

TABLE 1

|  | N Doping Method | End Face (T) N/C | End Face (C) N/C | Main Surface N/C | Corrosion Judgment | L/UL Test |
|---|---|---|---|---|---|---|
| Comparative Example 1 | No Doping |  |  |  | NG | NG |
| Comparative Example 2 | A | 0.03 | 0.08 | 0.13 | NG | NG |
| Example 1 | B | 0.10 | 0.10 | 0.10 | OK | OK |
| Example 2 | B | 0.18 | 0.18 | 0.18 | OK | OK |
| Example 3 | C | 0.11 | 0.11 | 0.11 | OK | OK |
| Example 4 | C | 0.17 | 0.17 | 0.17 | OK | OK |

In Table 1, End Face (T) represents a side wall face and End Face (C) represents a chamfered face. With respect to Corrosion Judgment, when the occurrence of corrosion was not observed as a result of the corrosion inspection, "OK" was given, while when the occurrence of corrosion was observed, "NG" was given. With respect to LUL Test, when load/unload operations of 800,000 times were endured, "OK" was given, while when a failure occurred due to crash or the like before 300,000 times although the LUL test was carried out without performing the corrosion test in advance, "NG" was given.

From the results of Table 1 described above, it is seen that the magnetic disks according to the Examples can obtain high reliability in the corrosion inspection and the LUL test. On the other hand, for example, in Comparative Example 2 in which nitrogen was doped into surfaces of the protective layer by the conventional method, since the content of nitrogen atoms in the protective layer particularly in the end face area is smaller than that in the main surface area, it is not possible to suppress water adhesion at a surface of a lubricating layer so that corrosion occurs due to the elution of internal components caused by this and thus the reliability cannot be obtained when used at high temperature and humidity.

While the embodiment of this invention has been described with reference to the accompanying drawings, the technical scope of this invention is not affected by the embodiment described above. It is apparent that a person skilled in the art can think of various changes and modifications in the category of the technical idea described in claims and it is understood that those also naturally belong to the technical scope of this invention.

The invention claimed is:

1. A magnetic disk comprising:
    a disk substrate, and
    a thin film including a magnetic layer, a carbon-based protective layer, and a lubricating layer formed in this order over the disk substrate,
    wherein a main surface and an end face of said magnetic disk are covered with said carbon-based protective layer, said carbon-based protective layer contains nitrogen at a part adjacent to the lubricating layer, and the content of nitrogen atoms relative to the content of carbon atoms in the protective layer formed on said end face is more than the content of nitrogen atoms relative to the content of carbon atoms in the protective layer formed on said main surface.

2. The magnetic disk according to claim 1, wherein the content of nitrogen atoms relative to the content of carbon atoms in the protective layer formed on said end face is 0.10 (atomic ratio) or more.

3. The magnetic disk according to claim 1, wherein the protective layer on the end face of said magnetic disk has a coverage of 95% or more.

4. The magnetic disk according to claim 1, wherein said carbon-based protective layer has the characteristics of a CVD-formed protective layer.

5. The magnetic disk according to claim 1, wherein said magnetic layer is a cobalt (Co) alloy based magnetic layer.

6. A method of manufacturing a magnetic disk, comprising:
    forming a magnetic layer and a carbon-based protective layer in this order over a disk substrate to cover a main surface and an end face of said magnetic disk with said carbon-based protective layer, and
    then doping nitrogen into said carbon-based protective layer at a part adjacent to a lubricating layer so that a content of nitrogen atoms relative to carbon in the protective layer formed on said end face is more than a content of nitrogen atoms relative to the content of carbon atoms in the protective layer formed on said main surface.

7. The magnetic disk according to claim 2, wherein the protective layer on the end face of said magnetic disk has a coverage of 95% or more.

8. The magnetic disk according to claim 2, wherein said carbon-based protective layer has the characteristics of a CVD-formed protective layer.

9. The A magnetic disk according to claim 3, wherein said carbon-based protective layer has the characteristics of a CVD-formed protective layer.

10. The magnetic disk according to claim 7, wherein said carbon-based protective layer has the characteristics of a CVD-formed protective layer.

11. The magnetic disk according to claim 2, wherein said magnetic layer is a cobalt (Co) alloy based magnetic layer.

12. The magnetic disk according to claim 3, wherein said magnetic layer is a cobalt (Co) alloy based magnetic layer.

13. The magnetic disk according to claim 4, wherein said magnetic layer is a cobalt (Co) alloy based magnetic layer.

14. The magnetic disk according to claim 7, wherein said magnetic layer is a cobalt (Co) alloy based magnetic layer.

15. The magnetic disk according to claim 8, wherein said magnetic layer is a cobalt (Co) alloy based magnetic layer.

16. The magnetic disk according to claim 9, wherein said magnetic layer is a cobalt (Co) alloy based magnetic layer.

17. The magnetic disk according to claim 10, wherein said magnetic layer is a cobalt (Co) alloy based magnetic layer.

* * * * *